Patented Sept. 28, 1954

2,690,408

UNITED STATES PATENT OFFICE 2,690,408

SOLDER FLUX COMPOSITIONS CONTAINING AN ARYL BIGUANIDE HYDROCHLORIDE

Leopold Pessel, Springfield Township, Montgomery County, Pa., assignor to Radio Corporation of America, a corporation of Delaware No Drawing. Application January 18, 1951,
Serial No. 206,729

8 Claims. (Cl. 148—23)

This invention relates to improved solder flux compositions.

Rapid soldering of metal joints is often made difficult by formation of various types of tarnish on the metal surfaces which are to be joined. Exposure of most metals to the atmosphere results in formation on their surfaces of thin layers of oxides or other compounds which should be removed if a good junction is to be made.

In small scale production, surface corrosion is usually removed by mechanically abrading the surfaces to be joined, prior to tinning. Mechanical abrading is too slow for mass production, however.

For mass production, chemical methods of removing corrosion from surfaces, prior to applying tinning metal or solder, have been proposed. Various acids, such as hydrochloric, or citric, have been used, for example. But these acids must be thoroughly removed from the metal surfaces after the cleaning operation since they, themselves, will produce corrosive deposits if permitted to remain on the metal.

In addition to cleaning surface corrosion from metal surfaces prior to soldering, it is also customary to apply a flux either before or simultaneously with the application of the solder metal. The action of the flux appears to result in enabling more rapid and more efficient wetting of the metal surfaces by the solder. Commonly used solder fluxes have been such materials as rosin and zinc chloride. Many other materials have also been proposed as fluxes.

Some of the previously used flux materials have the disadvantage of leaving corrosive residues in the solder joint, which eventually may cause the joint to deteriorate or break down altogether. This condition is particularly serious in the electrical industry since any deterioration of the solder joint is usually accompanied by a rise in the electrical resistance of the junction. Other previously proposed flux materials are water soluble. Although effective in making good solder joints, these water soluble materials absorb moisture when in contact with a moist atmosphere and, after a time, will often adversely influence the operation of electrical apparatus in which they are present.

The present invention provides improved solder flux compositions having an aryl biguanide hydrochloride as their principal ingredient. They also include any one of various types of non-volatile liquids, resins, or waxes as spreading agents. The improved solder compositions contain no ingredients which are appreciably soluble in water. They also dissolve oxides and other forms of tarnish commonly found on metals and leave no corrosive residues. The flux compositions may be used alone or incorporated with powdered, soft soldering metals.

One object of the present invention is to provide improved solder flux compositions.

Another object of the invention is to provide improved solder flux compositions which do not include any ingredients soluble in water to an appreciable extent.

Another object of the invention is to provide improved solder flux compositions which are also effective as cleaning agents.

Another object of the invention is to provide improved solder flux compositions which are non-corrosive in nature.

These and other objects will be more apparent and the invention will be more readily understood from the following detailed description including specific examples.

All of the improved solder flux compositions of the present invention contain one or more compounds from the class of aryl biguanide hydrochlorides. These materials are all substantially insoluble in water at room temperature. They are also practically inert, below their melting temperature, with respect to the metals commonly used in soft solder compositions. When heated above their melting points, however, the aryl biguanide hydrochlorides have been found to have exceptional fluxing properties. In order to function properly as soldering fluxes, these compounds should be combined with any one of several different types of spreading agents, some of which exert an additional fluxing effect, and, preferably, also with suspending agents.

One type of spreading agent suitable for use in the compositions of the present invention is natural resins.

Example 1

One suitable composition is made by shaking 8 gm. of rosin and 2 gm. of phenyl biguanide hydrochloride together in denatured ethyl alcohol until the rosin has dissolved and the biguanide hydrochloride is suspended in the liquid.

Example 2

5 gms. of rosin and 5 gms. of phenyl biguanide hydrochloride are heated in a casserole until both materials are completely molten. The melt is stirred until homogeneous. After cooling, the mixture is pulverized and shaken with 25 cc. denatured ethyl alcohol until all alcohol soluble matter is dissolved and the remainder is in suspension.

Besides rosin, other natural resins, such as copal gum, dammar gum, and shellac, may be used. These resins act as spreading agents in the compositions since they increase the fluidity of the compositions. They also have a fluxing effect on the solder metals.

Another type of spreading agent suitable for use in the compositions of the present invention is a wax.

Example 3

9 gms. of phenyl biguanide hydrochloride, 9 gms. of beeswax, and 9 gms. of petroleum wax are melted together, stirred until homogeneous, and then cooled. The resulting mass is pulverized and mixed with 30 cc. toluol until dissolution of the soluble material and suspension of the insoluble part of the composition.

Both resins and waxes may also be used in the same composition.

Example 4

2 gms. ortho tolyl biguanide hydrochloride, 4 gms. of powdered shellac, and 4 gms. of carnauba wax are shaken with 20 cc. denatured ethyl alcohol until all soluble matter is dissolved.

The suspending agent in these compositions may be any easily volatilized liquid, other examples being carbon tetrachloride, any of the lower aliphatic alcohols, or water.

Another class of materials found useful as spreading agents is high-boiling liquids which are immiscible with water and relatively inert chemically with respect to metals and the aryl biguanide hydrochlorides. These have no fluxing action, themselves. Examples of suitable liquids in this class are: heptadecanol, di-tertiary amyl phenoxy ethanol, amyl naphthalene, dodecyl toluene, fluid silicones, and polybutene.

In any of the above compositions, it is preferred that the aryl biguanide hydrochloride be present in the amount of about 50% by weight but reasonably satisfactory results are obtained when the biguanide hydrochloride constitutes from 5–99% of the composition. Besides the two examples of aryl biguanide hydrochloride mentioned in the examples, p-nitrophenyl biguanide hydrochloride has also been found to be particularly suitable and any of the members of this general class are operative.

In general, the compositions of the present invention are used in improved soldering operations by dipping the wires to be soldered in the compositions in order to cause adherence of some of the fluxing material, and then dipping the flux-coated wires into a pot of soft solder maintained at a temperature above the melting point of the aryl biguanide hydrochloride. If a suspending liquid vehicle is used, it flashes off quickly and the spreading agent spreads rapidly over the metal ahead of the solder. No precleaning is necessary and the flux residues are permitted to remain in and on the joint.

Examples of metals which have been successfully soldered with the compositions of the present invention are copper, copper alloys, zinc, iron, nickel, tin, and cadmium. Most of the metals which commonly become tarnished when exposed to the atmosphere and which can usually be soldered using soft solders are soldered in a more effective manner by using the compositions of the present invention.

The compositions of the present invention may be used with any of the soft solders. For example, tests have been run with solders ranging in composition from pure tin to 5% tin–95% lead. Tests have also been made using solders composed of 95% tin–5% antimony, 52% bismuth–32% lead–16% tin, and 95% lead–5% silver. Temperature of the solder pots was maintained at from 500°–700° F. Good solder joints were obtained in all cases and no deterioration was observed when the joints were exposed for extended periods in a humidity cabinet.

It is not necessary that the mixture of aryl biguanide hydrochloride and spreading agent be suspended in a vehicle. Where the spreading agent is a solid resin or wax, for example, the powdered mixture may be applied by dipping the ends of the wires in the powder.

Another method of utilizing the flux materials of the present invention is to make up a composition which includes the aryl biguanide hydrochloride, the spreading agent, and powdered solder. Examples of typical compositions follow.

Example 5

| | Gms. |
|---|---|
| Powdered ortho tolyl biguanide hydrochloride | 2 |
| Carnauba wax | 6 |
| 200 mesh tin powder | 92 |

Example 6

| | Gms. |
|---|---|
| Powdered phenyl biguanide hydrochloride | 3 |
| Polybutene fluid | 7 |
| 100 mesh, 60% tin–40% lead powder | 90 |

In this type of composition, the biguanide hydrochloride may be present within the percentages of about 0.1 to about 5% by weight with 2–3% being preferred. The spreading agent may constitute about 5–10% by weight of the composition with 6–7% being preferred and the spreading agent may be any of those previously mentioned in this application. Any powdered, soft solder metal may be used.

I claim:

1. A soldering flux composition comprising about 5% to about 99% by weight of an aryl biguanide hydrochloride and the remainder consisting essentially of a spreading agent selected from the class consisting of solid natural resins, waxes, and relatively inert, high boiling organic liquids, selected from the group consisting of heptadecanol, di-tertiary amyl phenoxy ethanol, amyl naphthalene, dodecyl toluene, fluid silicones and polybutene.

2. A composition according to claim 1 in which said spreading agent is rosin.

3. A composition according to claim 2 in which said rosin comprises 50% by weight of the composition and said hydrochloride is phenyl biguanide hydrochloride.

4. A composition according to claim 1 in which said spreading agent is shellac.

5. A composition according to claim 1 in which said spreading agent is beeswax.

6. A composition according to claim 1 in which said hydrochloride is phenyl biguanide hydrochloride and the high-boiling organic liquid is a polybutene.

7. A composition according to claim 1, including an easily vaporizable liquid vehicle which is inert with respect to the flux ingredients.

8. A soldering composition consisting essentially of powdered soft soldering metal, from 0.1 to 5% by weight of an aryl biguanide hydrochloride and about 5 to 10% by weight of a spreading agent selected from the class consisting of solid natural resins, waxes and relatively inert, high boiling organic liquids, selected from the group consisting of heptadecanol, di-tertiary amyl phenoxy ethanol, amyl naphthalene, dodecyl toluene, fluid silicones and polybutene.

References Cited in the file of this patent

UNITED STATES PATENTS

| Number | Name | Date |
|---|---|---|
| 1,744,784 | McDonough et al. | Jan. 28, 1930 |
| 1,748,180 | Lawhon | Feb. 25, 1930 |
| 1,772,952 | Knoth | Aug. 12, 1930 |
| 1,811,667 | Gravell | June 23, 1931 |
| 1,882,734 | Barber | Oct. 18, 1932 |
| 1,949,916 | McQuaid | Mar. 6, 1934 |
| 1,989,557 | Muller | Jan. 29, 1935 |
| 2,429,033 | Silman et al. | Oct. 14, 1947 |
| 2,522,937 | Forker | Sept. 19, 1950 |